Figure 4:
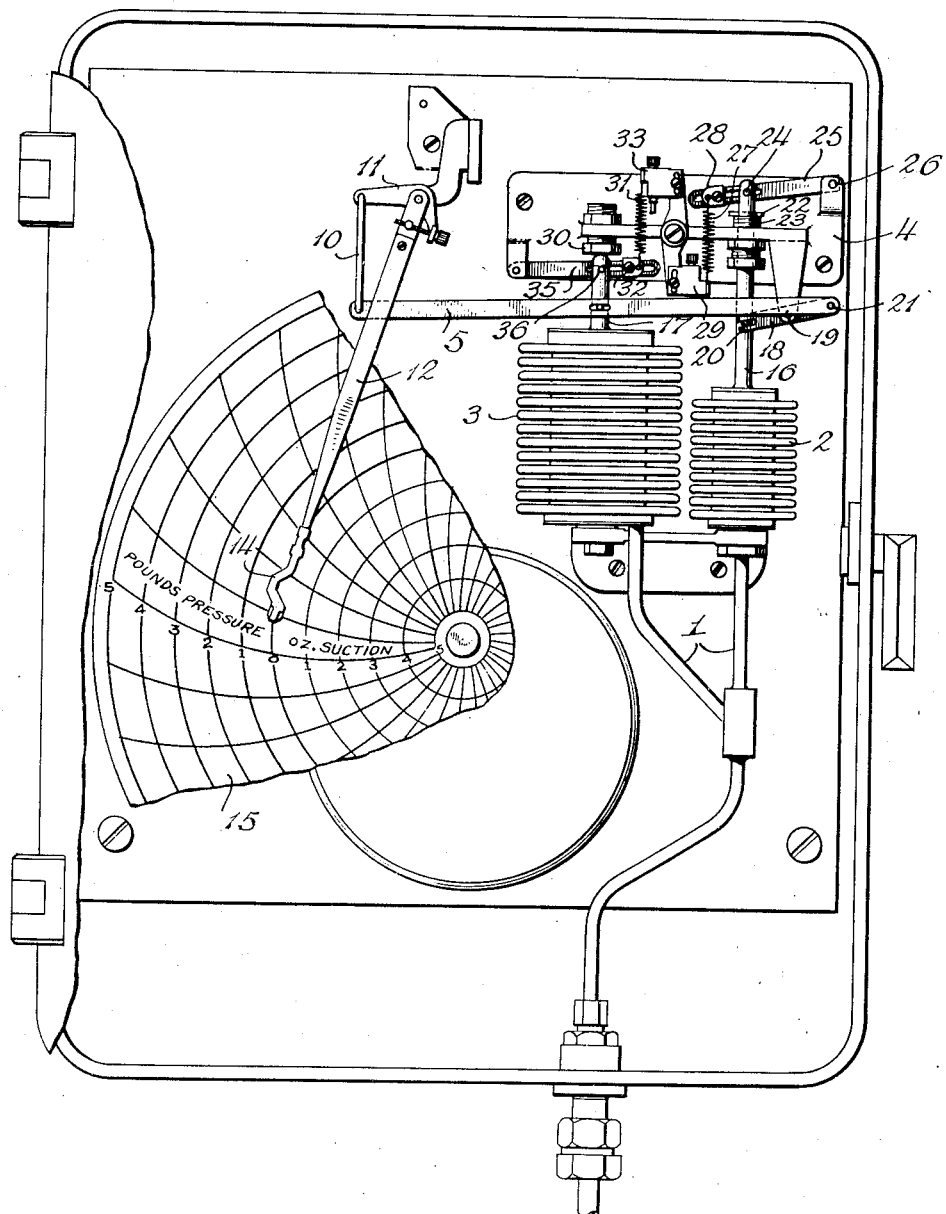

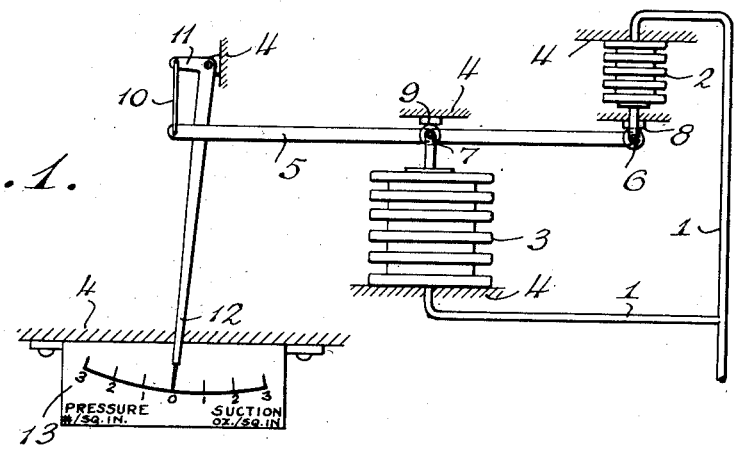
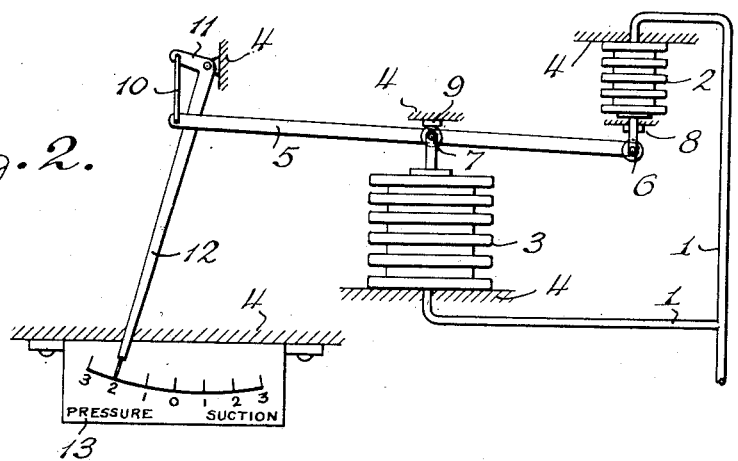
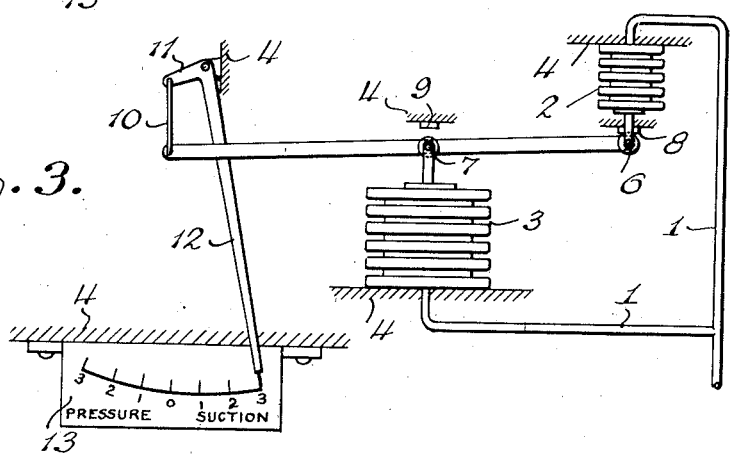

Nov. 25, 1941. P. F. K. ERBGUTH 2,264,263
MULTISENSITIVITY VARIABLE RESPONSIVE INSTRUMENT
Filed Aug. 3, 1940 2 Sheets-Sheet 2

WITNESS:
George Du Bon

INVENTOR.
PAUL F. K. ERBGUTH
BY
E. S. Smith
AGENT

Patented Nov. 25, 1941

2,264,263

UNITED STATES PATENT OFFICE 2,264,263

MULTISENSITIVITY VARIABLE RESPONSIVE INSTRUMENT

Paul F. K. Erbguth, Brooklyn, N. Y., assignor to Charles J. Tagliabue Mfg. Co., Brooklyn, N. Y., a corporation of New York Application August 3, 1940, Serial No. 351,031

11 Claims. (Cl. 73—110)

The invention relates generally to measuring devices of the class which have one sensitivity for values above, and another for values below, a datum value.

The invention particularly relates to devices for measuring both pressure and suction with a higher sensitivity with suction measurements than with gauge pressure measurements, a ratio of such sensitivities of sixteen-to-one being common as when an ounce per sq. in. of suction has the same graduation-spacing as a pound per sq. in. of gauge pressure. Such meters ordinarily record and/or indicate the value of the pressure relative to the atmosphere and are useful in many installations where a suction may introduce air by leakage to contaminate a gaseous fluid, such as hydrogen, in a pressure container, in which case an explosion hazard may exist while leakage of the hydrogen to the atmosphere would be less serious since it would be diluted to a non-dangerous degree. Another use is with sealed large hydraulic structures which stand high internal pressures but fail under low suction.

A principal object of the invention is to provide an improved device which responds with different sensitivities to values respectively above and below a datum value.

A specific object of the invention is to provide an improved measuring device having a simple and compact unitary measuring device which is differently responsive to departures from atmospheric pressure in opposite directions. A related object is to provide such a device with an improved means for so adjusting the indicated zero value of the pressure and the pressure that they substantially coincide and for calibrating the device for variations of individual elements.

These and other objects of the invention will appear to those skilled in the art from the specification and the accompanying drawings in which are described and illustrated two pressure-suction meters by way of example as two embodiments of the invention. In the hereinafter appended claims, it is my intention to claim all that I have herein disclosed which is inventive, novel and useful.

In the accompanying drawings, wherein like characters of reference indicate like parts throughout, Figs. 1, 2 and 3 are diagrammatic front elevations of one embodiment of the invention which shows the invention applied to a pressure-suction indicator by means of a simple linkage, Figs. 1, 2, and 3, respectively showing the instrument connected with the atmosphere, with a source of positive pressure (i. e. one which is higher than atmospheric), and with a suction (i. e. one which is lower than atmospheric); and Fig. 4 is a much less diagrammatic front elevation of the preferred embodiment of the invention and shows a pressure-suction recorder having the front cover and the chart broken away and with a more practical arrangement of the bellows.

In Figs. 1-3, a source of pressure (not shown) is connected by pipe 1 with the fixed end of pressure bellows 2 and of suction bellows 3, each bellows being mounted at such ends on a fixed base 4. Lever 5 is pivotally connected with the movable ends of bellows 2 and 3 respectively by pins 6 and 7 at the right hand end and the middle of lever 5. Fixed stops 8 and 9 are respectively provided for pins 6 and 7 to limit the latters' travel in a vertical direction. The left hand end of lever 5 is connected by link 10 with the horizontal lever of bell-crank 11 of which the depending arm is the index 12 which is disposed adjacent its graduated scale 13. While the stops have been shown as acting by keeping the bellows from moving, the stressing of the bellows may be prevented by the use of loose-links which are well known in this art for such purpose and need not be shown since the bellows disclosed by way of example are of a type which will stand considerable pressures in either direction without taking a set.

In the pressure condition shown in Fig. 1, i. e. with atmospheric pressure in both bellows 2 and 3, both pins 6 and 7 are up against their respective stops 8 and 9 and the index is shown on the zero for both pressure and suction, where it should then be.

With positive pressure in line 1 and in both bellows 2 and 3, the parts of the instrument are in the positions shown in Fig. 2, i. e. with pin 7 up against its stop 9 which acts as a fixed fulcrum so that lever 5 becomes a compound lever with the movement of pin 6 and the end of bellows 2 driving the lever 5 and the index 12 with one ratio of multiplication, the unit for the graduations of scale 13 being pounds per sq. in. for this pressure condition.

With suction, i. e. negative pressure, in line 1, the parts of the instrument are in the positions shown in Fig. 3, i. e. with pin 6 up against its stop 8 and with lever 5 acting as a simple lever with the movement of pin 7 and the end of bellows 3 driving the lever 5 and the index 12 with a much higher ratio of multiplication, the unit for the graduations of scale 13 for the suction side being ounces per sq. in., which ratio is sixteen times that for the positive pressure condition. As shown, suction bellows 3 has a much larger cross-sectional area than has that of the pressure bellows 2 which accounts for some of the increase of multiplication; however, the simple lever has considerably more multiplication than has the compound lever in the arrangement shown and provides an advantageous and simple solution for the problem.

In view of the simple nature of the embodiment just described and the fact that several figures were used in making clear the operation of the device, it is believed to be unnecessary to add anything further thereto. The invention is not limited to pressure but any other physical variable which varies both above and below a datum value could be readily measured with different sensitivities in different complemental measuring ranges in accordance with this disclosure.

In Fig. 4, pen 14 and its chart 15 respectively replace the index 12 and scale 13 of Figs. 1–3, and the pressure bellows 2 is dropped to be on the same side of lever 5 as is suction bellows 3, a change which requires that the movement of bellows 2 be reversed which has been done by the arrangement about to be described. This arrangement permits both bellows to drain when measuring the pressure of a gas or, if inverted, for trapped air to escape when measuring the pressure of a liquid. While single levers have been diagrammatically shown, double levers are ordinarily used in the commercial device which this figure represents. Also, it may be noted that under the invention the bellows may expand due to an increase of volume, as in liquid-actuated thermometers, rather than pressure.

Rods 16 and 17 are respectively mounted on the movable ends of bellows 2 and 3 and move with such ends. The movement of bellows 2 is carried to lever 5 by compound lever 18 which is pivotally mounted upon pin 19 which is affixed to the base 4. Pin 20 is attached to rod 16 and coacts with a slot in the left hand end of lever 18 to angularly move such lever when the bellows 2 moves due to positive pressure therein. The right hand end of lever 18 carries pin 21 which is pivotally attached to lever 5 to serve as a fulcrum therefor. Near the upper end of rod 16 is a stop pin 22 which coacts with adjustable stop hollow screw plug 23 which is adjustably mounted in the base 4 and provided with a locking nut. The upper end of rod 16 carries a pin 24 which coacts with a slot in a lever 25 to angularly move such lever. The right hand end of lever 25 is pivotally mounted on a fixed pin 26 which is affixed to the base 4. The left hand end of this lever is attached to a spring 27 which biases lever 25 to move rod 16 downwardly by means of pin 24, the upper end of the spring being attached to lug 28 so that its effective radius is readily adjustable and the lower end of the spring being attached to base 4 by way of the adjustment block 29 by which its tension may be set as desired.

In other words, the pin 22 determines the lowest position which can be taken by rod 16 and the movable end of bellows 2 and the spring 27 is adjustable by block 29 to cause the bellows to take such position while atmospheric pressure is within bellows 2. The adjustment of lug 28 permits the calibration to suit individual bellows 2 which may have slightly different sensitivities of travel per unit of pressure since both the effective area and the stiffness of such bellows varies for different bellows.

Suction bellows 3 is kept from moving from its zero position while positive pressure is within the bellows by means of the adjustable solid stop 30 which is abutted by the upper end of rod 17 which moves with the movable end of bellows 3. For calibrating and adjusting purposes, biasing spring 31 is provided and attached to lug 32 and vertically adjustable block 33, lug 32 being adjustable along slotted lever 35 whose slot coacts with pin 36 which is carried by the upper end of rod 17. The arrangement is generally the same as with bellows 2, except that the downward movement of bellows 2 is prevented in the presence of suction therein and that the upward movement of bellows 3 is prevented in the presence of pressure therein, both movements being relative to the zero pressure condition of the bellows.

The operation of the device of Fig. 4 is generally like that of the device of Figs. 1–3. However, it may be noted that, as before, the expansion of pressure bellows 2 with positive pressure therein causes a downward movement of the right hand end of lever 5 due to the reversing action of idler lever 18, and that the provision of the described adjusting means permits the ready calibration in the shop of the instrument and the simple and handy adjustment in the field as to zeroing, which is a more serious problem than it might seem offhand due to the necessity for using widely different sensitivities for suction and for pressure. While the several features have been particularly described for use in a suction-pressure gauge, it is believed that the present disclosure would enable the present invention to be used by one skilled in the industrial instrument art in which the value of any physical variable, or any two variables which are to be measured or controlled complementally with respect to time, is to be measured or controlled on both sides of a datum value with either the same or different sensitivities. In the claims, sensitivity is the ratio of effect to cause and, in a suction-pressure meter, is the ratio of the movement of the display means per unit change of the pressure difference which operates the bellows. Also the expression "on opposite sides of a datum position of the member" is intended to include other than uni-planar movement of the member as, e. g., an actuation of the member in one plane by one sensitive element and in another by the other sensitive element where the planes intersect at the datum position.

The terms and expressions which I have employed are used as terms of description and not of limitation, and I have no intention, in the use of such terms and expressions, of excluding any equivalents of the features shown and described or portions thereof except as specified above, but recognize that various modifications are possible within the scope of the invention claimed.

I claim:

1. In an instrument of the measuring and controlling class disclosed, the combination of two elements whose responsive positions are differently sensitive to the value of a physical variable, one of said elements being suitable for operation above a datum value of the variable and the other for operation below said datum value, a member which is operatively connected with said elements to be displaced from a datum position which corresponds with the datum value by one element in one direction relative to said datum position and by the other element in another direction, and a stop means for each of said elements to limit the movement of the respective element and hence the movement of the member by either element only to the side of the datum value for which the then effective element is suitable.

2. In a pressure instrument having a base, the combination of two pressure responsive elements mounted on said base whose positions are differently sensitive to the value of a pressure from a source which is connectable with both of said elements, one of said elements being suitable for operation above a datum value of the variable and the other for operation below said datum value, a member which is operatively connected with said elements to be displaced from a datum position which corresponds with the datum value by one element in a direction relative to said datum position and by the other element in the opposite direction, and a stop means for each of said elements mounted on said base to limit the movement of the respective element and hence the movement of the member by either element only to the side of the datum pressure for which the then effective element is suitable.

3. In a pressure-suction instrument including a base, the combination of two bellows which are mounted upon said base and are differently sensitive to the value of a pressure which varies with respect to a datum value, one of said bellows being suitable for positive pressure operation relative to the datum pressure and the other being suitable for operation under suction with a higher sensitivity than that of the positive pressure bellows, a member which is operatively connected with said bellows to be displaced from a datum position which corresponds with the datum value by the pressure bellows in one direction relative to the datum position and by the suction bellows in the opposite direction, and a stop means for each of said bellows mounted upon said base to limit their respective displacements to the stated directions, whereby the ranges of operation meet without overlap at the datum position.

4. The combination set forth in claim 3 in which the stated positions of the bellows are affected by a force and including a biasing means for each bellows which is constructed and arranged relative to said bellows and to said base to impose a force which varies with the length of the bellows upon the movable end of each bellows which means is adjustable both as to the value of the force and to the rate of variation of the force with the length of the bellows.

5. The combination set forth in claim 3 in which the stated positions of the bellows are affected by a force and including a biasing means for each bellows which is constructed and arranged relative to said bellows and to said base to impose a force which varies with the length of the bellows upon the movable end of each bellows which means is adjustable as to the value of the force to bring the movable end of the bellows to the position corresponding with the datum position of the member when the pressure within the bellows is at the datum value.

6. The combination set forth in claim 3 in which the stated positions of the bellows are affected by a force and including a biasing means for each bellows which is constructed and arranged relative to said bellows and to said base to impose a force which varies with the length of the bellows upon the movable end of each bellows which means is adjustable as to the rate of variation of the force with the length of the bellows to calibrate the bellows as to its rate of variation of length with pressure.

7. In an instrument of the measuring and controlling class disclosed and having a base, the combination of two elements whose lengths are differently sensitive to the value of a physical variable, one of said elements being suitable for operation above a datum value of the variable and the other for complemental operation below said datum value, a lever which is operatively connected with said elements to have one end displaced from a datum position which position corresponds with the datum value by one element in one direction relative to said datum position and by the other element in the opposite direction, both of said elements having one end mounted on said base, the movable end of the less sensitive of said elements being pivotally connected to the other end of the lever and that of the more sensitive of said elements being pivotally connected to an intermediate point of said lever, and a stop means for each of said elements attached to said base and arranged to abut both of said elements when they are in their datum condition to limit the movement of each of said elements to its respective portion of the lever-operation range, the arrangement being such that the lever acts as a simple lever of higher sensitivity when the element which is connected with the end of the lever abuts its stop and the value of the variable is in the range for which the other element is suitable and as a compound lever of lower sensitivity when such other element abuts its stop and the value of the variable is in the other range.

8. In an instrument of the measuring and controlling class disclosed and having a base, the combination of two elements whose lengths are differently sensitive to the value of a physical variable, one of said elements being suitable for operation above a datum value of the variable and the other for operation below said datum value, a lever which is operatively connected with said elements to have one end displaced from a datum position which corresponds with the datum value by one element in one direction relative to said datum position and by the other element in the opposite direction, both of said elements having one end mounted on said base, the movable end of each of said elements being operatively connected to points on said lever spaced from said end and from each other, one of said elements being connected with the lever so that the connected point of the lever moves in the same direction as the movable end of such element, an idler means connecting the movable end of the other element with the other point of connection with the lever to move the lever in the opposite direction from that of the movable end of the last mentioned element, and a stop means for each of said elements attached to said base and arranged to abut said elements when they are in their datum condition to limit the movement of each of said elements to its respective portion of the lever-operation range, the arrangement being such that the lever acts as a simple lever of higher sensitivity when the element which is connected with the end of the lever abuts its stop and the value of the variable is in the range for which the other element is suitable and as a compound lever of lower sensitivity when such other element abuts its stop and the value of the variable is in the other range.

9. In a pressure-suction instrument including a base, the combination of two cylindrical bellows which are disposed to have their axes vertical and which have their lower ends mounted upon said base and which are sensitive to the value of a pressure which varies with respect to a datum value, one of said bellows being suitable for extension under positive pressure and the other being suitable for operation under suction with a higher sensitivity than that of the pressure bellows, a lever which is operatively connected with said bellows to have one end displaced thereby from a datum position which corresponds with the datum value by the pressure bellows in one direction relative to the datum position and by the suction bellows in the opposite direction, the movable ends of said bellows being operatively connected to points on said lever spaced from said end and from each other, one of said movable ends being connected with the lever so that the connected point of the lever moves in the same direction as such movable end, an idler means connecting the movable end of the other bellows with the other stated point of connection with the lever to move the lever in the opposite direction from that of the movable end of the last mentioned bellows, a stop means for each of said bellows attached to said base and arranged to abut said elements when they are in their datum condition to limit the movement of each of said elements to its respective portion of the lever-operation range, the arrangement being such that the lever acts as a simple lever when the bellows which is connected farthest from the first named end of the lever abuts its stop and the value of the pressure is in the range for which the other bellows is suitable and as a compound lever when the other bellows abuts its stop and the value of the pressure is in the other range, and a biasing means for each of said bellows constructed and arranged relative to said bellows and to said base to impose upon the movable end of its respective bellows a force which varies with the length of the bellows, which means is adjustable both as to the value of the force and the rate of variation of the force with the length of the bellows.

10. In an industrial instrument for measuring or controlling the value of a physical variable, in combination, a lever having two pins spaced from an end which is to be moved in correspondence with the position of either but not both of said pins simultaneously, two elements each of which is respectively operatively connectable with one of said pins and differently sensitive to the value of the variable relative to a datum value, and a stop for each of said pins to limit the movement of its respective pin, one stop being effective to limit the movement of its respective one of said elements in one lever-actuating direction and the other stop being effective to limit the movement of the other of said elements in the opposite lever-actuating direction, the arrangement being such that the lever acts as a simple lever when the element which is connected farthest from the first named end of the lever abuts its stop at which time the other element effectively positions the lever and as a compound lever when the other element abuts its stop at which time the first mentioned element effectively positions the lever.

11. In an instrument of the measuring and controlling class, the combination of a lever which is displaceable in opposite directions from a datum position over a range of operating positions, two independently movable means whose positions are complementally responsive to the value of a physical variable to be measured or controlled over an operating range of values of said variable and which means are operatively connectable with said lever at two spaced points along said lever to have one of said means effective to displace the lever in correspondence with such means' position in one of said directions and to have the other of said means substantially complementally effective to displace the lever in correspondence with said other means' position in the other of said directions, the stated connections of said means with said lever constituting the fulcrums of said lever, and a stop for each of said means to limit the movement of its respective means, one stop being arranged to be effective in one lever-operating direction and the other stop being arranged to be effective in the opposite lever-operating direction.

PAUL F. K. ERBGUTH.